United States Patent [19]
Watson

[11] Patent Number: 5,467,830
[45] Date of Patent: Nov. 21, 1995

[54] WEEDING DEVICE

[75] Inventor: Gene Watson, Carefree, Ariz.

[73] Assignee: Henry R. Hoffman, Dallas, Tex.

[21] Appl. No.: 132,198

[22] Filed: Oct. 6, 1993

[51] Int. Cl.⁶ .................................................. A63B 57/00
[52] U.S. Cl. ............................ 172/378; 254/132; 294/60
[58] Field of Search ............................. 254/132; 294/60, 294/59; 172/371, 378

[56] References Cited

U.S. PATENT DOCUMENTS

| | | | |
|---|---|---|---|
| 698,715 | 4/1902 | Knight | 172/378 X |
| 1,085,505 | 1/1914 | Stafford | 172/371 |
| 2,017,436 | 10/1935 | Gebhardt | 254/132 |
| 2,041,263 | 5/1936 | Nirdlinger | 254/132 |
| 2,378,459 | 6/1945 | Beardsley | 172/371 |
| 2,928,655 | 3/1960 | Armstrong | 254/132 |
| 2,969,120 | 1/1961 | Randolph | 172/371 |
| 3,293,674 | 12/1966 | Sapia . | |
| 3,680,641 | 8/1972 | Hein | 172/371 |
| 3,847,226 | 11/1974 | Long | 172/371 |
| 3,865,348 | 2/1975 | Close | 254/132 |
| 3,957,299 | 5/1976 | Johnson et al. | 294/50.9 |
| 3,981,043 | 9/1976 | Curry | 172/371 X |
| 4,243,206 | 1/1981 | Heikkinen | 254/132 |
| 4,815,778 | 3/1989 | Hoch | 294/55.5 |
| 4,884,805 | 12/1989 | Patterson | 172/378 X |
| 4,955,609 | 9/1990 | Kassen | 273/162 F |
| 5,014,792 | 5/1991 | Gierloff | 172/371 |
| 5,042,778 | 8/1991 | Szazy | 254/132 |
| 5,209,469 | 5/1993 | Laskowitz et al. | 172/378 X |

FOREIGN PATENT DOCUMENTS

| | | | |
|---|---|---|---|
| 788689 | 7/1968 | Canada | 172/378 |
| 1377634 | 9/1964 | France | 172/371 |
| 3515779 | 11/1986 | Germany | 172/371 |
| 369560 | 3/1939 | Italy | 294/60 |
| 373589 | 1/1964 | Switzerland | 172/378 |
| 18001 | of 1910 | United Kingdom | 172/378 |
| 958860 | 5/1964 | United Kingdom | 172/371 |
| 2132061 | 7/1984 | United Kingdom | 294/60 |

Primary Examiner—David H. Corbin
Assistant Examiner—Christopher J. Novosad
Attorney, Agent, or Firm—Tilton, Fallon, Lungmus & Chestnut

[57] ABSTRACT

A weeding device includes an elongated shaft, a ground-penetrating tool on one end of the shaft, a pad on the shaft adjacent the tool, and a handle on the other end of the shaft. The user pushes the tool into the ground adjacent a weed and kicks the pad with his foot to force the weed out of the ground.

11 Claims, 1 Drawing Sheet

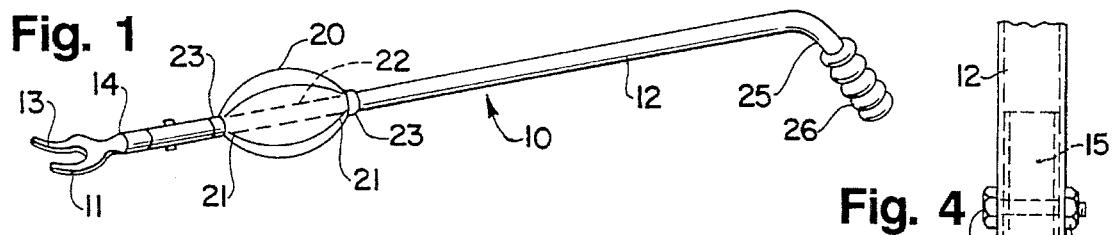
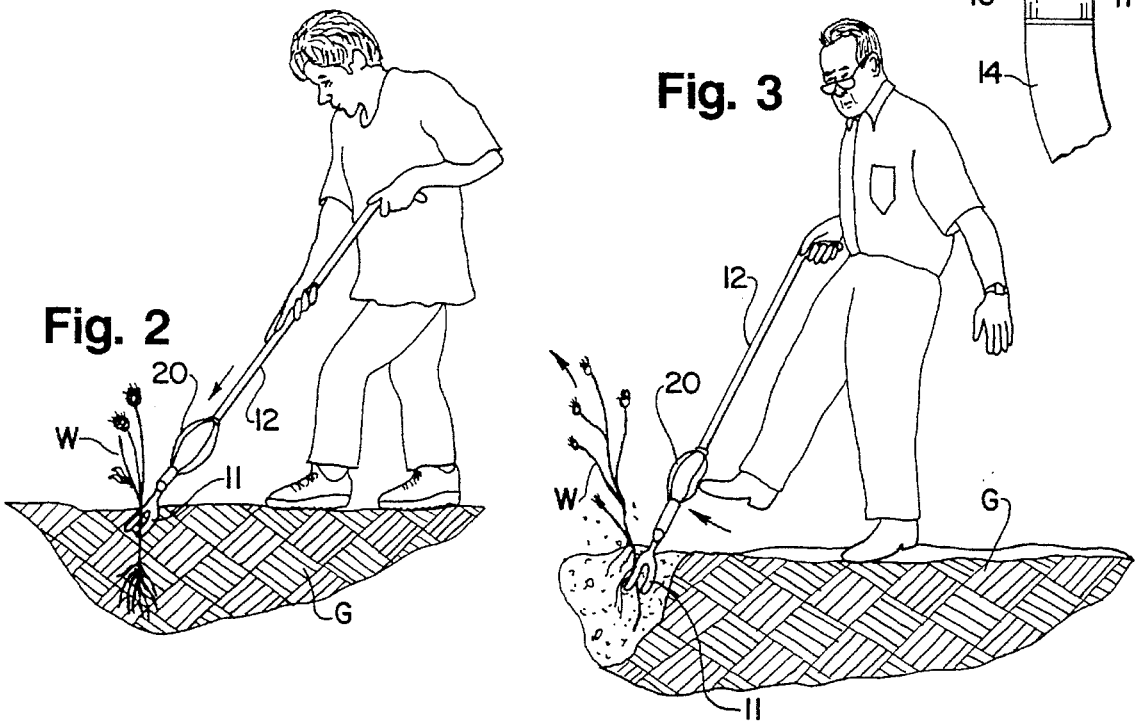
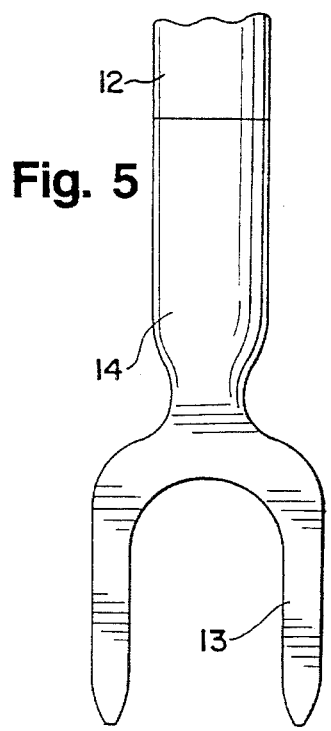
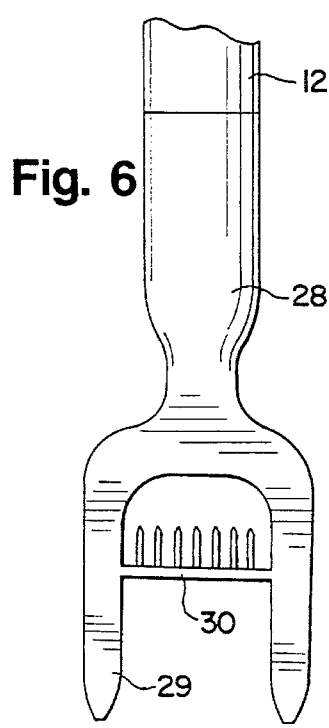
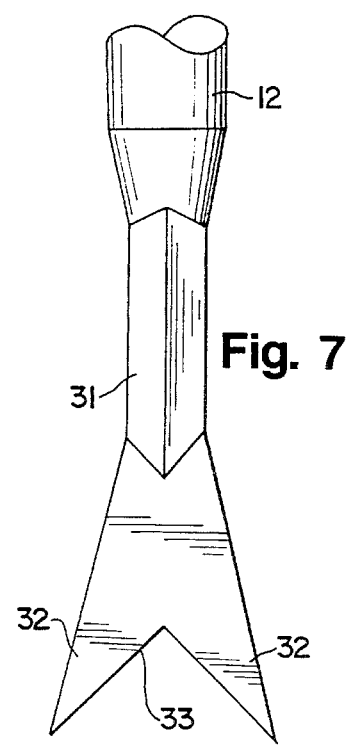

WEEDING DEVICE

BACKGROUND AND SUMMARY

This invention relates to a weeding device, and, more particularly, to a weeding device with a football-shaped pad which the user kicks to remove a weed.

Weeding is a tedious but necessary task which faces every homeowner. Hand tools are effective for removing weeds but require the user to bend or kneel. Weeding devices with long handles which do not require kneeling or excessive bending are also available. However, such devices generally operate by prying the weeds out of the ground. The prying action requires the user to exert a levering action on the handle with both hands. Still other devices are available which are operated by the user's foot to remove the weed. Such devices also rely on a prying or pivoting action.

The invention provides a weeding device which removes weeds with a simple kicking action. The device not only removes weeds quickly and easily but provides a measure of enjoyment to an otherwise laborious activity. The device includes a ground-penetrating tool which is mounted on a long handle and which can be inserted into the ground with one hand. A compressible and resilient pad is mounted on the lower end of the shaft, and the device is operated by kicking the pad. In the preferred embodiment the pad is shaped like a football.

DESCRIPTION OF THE DRAWING

The drawing will be explained in conjunction with illustrative embodiments shown in the accompanying drawing, in which FIG. 1 is a perspective drawing of a weeding device formed in accordance with the invention;

FIG. 2 illustrates the weeding device being inserted into the ground;

FIG. 3 illustrates the step of removing a weed;

FIG. 4 is an enlarged fragmentary view of the lower portion of the weeding device;

FIG. 5 is a fragmentary front elevational view of the ground-penetraing tool; and FIGS. 6 and 7 are views similar to FIG. 5 of different tools.

DESCRIPTION OF SPECIFIC EMBODIMENT

Referring to FIG. 1, a weeding device 10 includes a ground-penetrating tool 11 which is mounted on an elongated shaft 12. The tool illustrated in FIGS. 1 and 5 is formed from steel and includes a pair of pointed prongs or tines 13 and a shank 14. The upper end of the shank includes an attaching portion 15 (FIG. 4) which is inserted into a bore in the bottom end of the shaft 12. The tool is secured by a bolt 16 and a nut 17.

A compressible and resilient pad 20 is mounted on the lower portion of the shaft above the tool 11. The particular pad illustrated is shaped like a football and includes a pair of ends 21 and a central bore or passageway 22 which extends along the longitudinal axis of the pad from one end to the other. The shaft 12 extends through the bore, and the position of the pad is secured by adjustable retaining collars 23, for example, conventional screw-operated straps. The position of the pad can be adjusted as desired by loosening the collars and sliding the pad along the shaft.

The upper end of the shaft 12 is bent away from the axis of the main portion of the shaft to form a handle 25, A knurled rubber or plastic grip 26 is mounted on the handle.

The operation of the device is illustrated in FIGS. 2 and 3. The tool 11 is inserted into the ground G behind a weed W by pushing down on the shaft 21. Although FIG. 2 illustrates the shaft being pushed with two hands, the tool can also be inserted with one hand by pushing the handle 25. After the tool is inserted, the user kicks the pad 20 with his or her foot while holding the handle with one hand. The force of the kick moves the tool against the weed and forces the weed out of the ground. The tool pivots generally about the handle end of the shaft when the pad is kicked.

The weeding device can be operated without bending or stooping, and the weeds are removed without any prying force from the hands. A simple kicking action removes the weeds.

In the preferred embodiment the pad has the look and feel of a miniature football. The pad can include a cover with a pebbled surface, stitches, and lacing of a conventional football. If desired, the pad can also be printed with a favorite team name or logo. Kicking the football transforms what is ordinarily a laborious task to an enjoyable activity. Even children will willingly participate in ridding a lawn of weeds.

The pad should be compressible to reduce shock to the foot and should be resilient so that the pad retains its shape after repeated kicks. The pad can include a polyurethane foam body and a plastic or leather cover. Alternatively, the pad can be formed completely of foamed plastic which is injection molded in the desired shape.

FIGS. 6 and 7 illustrate different embodiments of the ground-penetrating tool. In FIG. 6 a tool 28 inclues a pair of prongs 29 and a sharpened blade 30 which extends between the prongs. In FIG. 7 a tool 31 includes a pair of diverging pointed prongs 32 whch are separated by a triangular notch 33.

While in the foregoing specification, a detailed description of a specific embodiment of the invention was set forth for the purpose of illustration, it will be understood that many of the details herein given may be varied considerably by those skilled in the art without departing from the spirit and scope of the invention.

I claim:

1. A device for removing weeds from the ground comprising:
    an elongated shaft having first and second ends,
    a relatively sharp ground-penetrating tool mounted in the first end of the shaft, and
    a compressible and resilient pad shaped like a football mounted on the shaft adjacent said ground-penetrating tool, said pad including a pair of ends and a passage extending through the pad between the two ends, said shaft extending through said passage.

2. The device of claim 1 including a handle on the second end of the shaft.

3. The device of claim 1 in which said shaft includes a relatively straight main portion and a handle portion at the second end of the shaft which extends angularly from the main portion.

4. The device of claim 3 including a grip mounted on the handle portion.

5. The device of claim 1 in which said ground-penetrating tool is formed from metal and includes a pair of prongs.

6. A method of removing a weed from the ground comprising the steps of:

mounting a ground-penetrating tool on one end of an elongated shaft, mounting a compressible and resilient pad on the shaft adjacent the ground-penetrating tool, inserting the ground-penetrating tool into the ground near a weed, holding the shaft adjacent the other end thereof, and kicking the pad, whereby the ground-penetrating tool forces the weed out of the ground.

7. The method of claim 6 in which the shaft includes a handle portion on said other end and the ground-penetrating tool is inserted into the ground by pushing on the handle portion.

8. A device for removing weeds from the ground comprising:

an elongated shaft having first and second ends, a relatively sharp ground-penetrating tool mounted in the first end of the shaft, the shaft having a gripping portion adapted to be gripped by the hands of a person and the length of the shaft being such that a person can hold the shaft and insert the ground-penetrating tool into the ground while the person stands substantially erect, and a compressible and resilient pad mounted on the shaft adjacent said ground-penetrating tool below the gripping portion whereby a person can kick the pad with a foot-while standing substantially erect, said paid being sufficiently compressible to deform and reduce shock to the foot when kicked and being sufficiently resilient to retain its shape after repeated kicks and deformations.

9. The device of claim 8 in which the pad is formed of polyurethane foam.

10. The device of claim 8 in which said pad is formed completely of foamed plastic which is injection molded.

11. The device of claim 10 in which said pad is injection molded in the shape like a football.

\* \* \* \* \*

UNITED STATES PATENT AND TRADEMARK OFFICE
CERTIFICATE OF CORRECTION

PATENT NO. : 5,467,830
DATED : November 21, 1995
INVENTOR(S) : Stanley Gene Watson It is certified that error appears in the above-identified patent and that said Letters Patent is hereby corrected as shown below:

Col. 4, line 8 change "paid" to --pad--.

Signed and Sealed this

Twelfth Day of March, 1996

Attest:

BRUCE LEHMAN

Attesting Officer     Commissioner of Patents and Trademarks